US012744011B2

(12) United States Patent
Cheng

(10) Patent No.: US 12,744,011 B2
(45) Date of Patent: Sep. 22, 2026

(54) DISPLAY DRIVER CHIP AND COLOR DEVIATION COMPENSATION METHOD THEREOF

(71) Applicant: NOVATEK Microelectronics Corp., Hsin-Chu (TW)

(72) Inventor: Huan-Teng Cheng, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 19/069,252

(22) Filed: Mar. 4, 2025

(65) Prior Publication Data

US 2026/0141868 A1 May 21, 2026

(30) Foreign Application Priority Data

Nov. 20, 2024 (TW) ................................ 113144587

(51) Int. Cl.
*G09G 3/34* (2006.01)

(52) U.S. Cl.
CPC ... *G09G 3/3413* (2013.01); *G09G 2320/0242* (2013.01); *G09G 2320/0285* (2013.01); *G09G 2360/16* (2013.01); *G09G 2380/02* (2013.01)

(58) Field of Classification Search
CPC .................. G09G 2380/02; G09G 2320/0242
See application file for complete search history.

(56) References Cited

U.S. PATENT DOCUMENTS

| | | | | |
|---|---|---|---|---|
| 2008/0100884 | A1* | 5/2008 | Seo | H04N 1/387 358/488 |
| 2016/0042714 | A1* | 2/2016 | Chang | G09G 5/026 345/156 |
| 2019/0042042 | A1* | 2/2019 | Hei | G06F 1/1652 |
| 2021/0125538 | A1 | 4/2021 | Lee | |
| 2021/0241670 | A1* | 8/2021 | Orio | G09G 3/035 |
| 2022/0068220 | A1* | 3/2022 | Kim | G09G 3/3266 |
| 2023/0005402 | A1* | 1/2023 | Peng | G06F 3/013 |
| 2023/0105229 | A1* | 4/2023 | Yoo | G06F 3/013 345/690 |
| 2024/0184327 | A1* | 6/2024 | Zhang | G06F 1/183 |
| 2025/0348166 | A1* | 11/2025 | Cho | G06F 3/0488 |

FOREIGN PATENT DOCUMENTS

| | | |
|---|---|---|
| TW | 201706977 | 2/2017 |
| TW | 202333134 | 8/2023 |

* cited by examiner

*Primary Examiner* — Bipin Gyawali
(74) *Attorney, Agent, or Firm* — Winston Hsu

(57) ABSTRACT

A display driver chip for a flexible display includes a display control circuit and a crease compensation circuit. The display control circuit is coupled to a display panel of the flexible display and configured to provide a driving signal to a corresponding pixel of the display panel. The crease compensation circuit is coupled to the display control circuit and configured to execute a color deviation compensation method. The color deviation compensation method includes obtaining a folding angle of a folding portion of the flexible display; determining a color deviation compensation value for a sub-pixel of the pixel according to the folding angle; and adjusting a sub-pixel value of the sub-pixel according to the color deviation compensation value.

22 Claims, 11 Drawing Sheets

DISPLAY DRIVER CHIP AND COLOR DEVIATION COMPENSATION METHOD THEREOF

BACKGROUND OF THE INVENTION

1. Field of the Invention

The present invention relates to a display driver chip and a color deviation compensation method thereof, and more particularly, to a display driver chip and a color deviation compensation method thereof for a flexible display.

2. Description of the Prior Art

In recent years, the advancement of flexible display technology has enabled display panels to change shapes to meet various needs, such as showing arc-shaped, ring-shaped and other curved surfaces, bringing users a completely new experience. In addition, flexible displays have been widely used in small portable devices such as smartphones and tablet PCs. For example, foldable phones utilize flexible display technology to allow the screen to be folded repeatedly. Therefore, users can unfold the screen of a foldable phone to enjoy the visual effect of a large screen or fold the screen to minimize the size for carrying and storing.

SUMMARY OF THE INVENTION

Therefore, the present invention aims to provide a display driver chip and a color deviation compensation method thereof for improving image quality of a flexible display.

An embodiment of the present invention discloses a display driver chip for a flexible display. The display driver chip includes a display control circuit and a crease compensation circuit. The display control circuit is coupled to a display panel of the flexible display and configured to provide a driving signal to a corresponding pixel of the display panel. The crease compensation circuit is coupled to the display control circuit and configured to execute a color deviation compensation method. The color deviation compensation method includes obtaining a folding angle of a folding portion of the flexible display; determining a color deviation compensation value for a sub-pixel of the pixel according to the folding angle; and adjusting a sub-pixel value of the sub-pixel according to the color deviation compensation value.

An embodiment of the present invention further discloses a color deviation compensation method for a display driver chip of a flexible display. The color deviation compensation method includes obtaining a folding angle of a folding portion of the flexible display; determining a color deviation compensation value for a sub-pixel of a pixel according to the folding angle; and adjusting a sub-pixel value of the sub-pixel according to the color deviation compensation value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Foldable phones utilize flexible display technology to allow the display panel to be folded repeatedly by the user, which greatly improves the flexibility of the smartphone in use. However, repeated stress will cause the display panel to creep, leaving an obvious crease on a folding portion of the display panel. To improve this phenomenon, the industries generally make efforts to improve the hinge mechanism to reduce damage to the folding portion of the flexible display. Common hinge mechanisms include U-shaped hinges and teardrop hinges, and the common design thereof focuses on ensuring that the bending portion of the flexible display maintains a sufficiently large curvature radius to minimize deformation while folding the display panel, thereby reducing damage to the folding portion. However, while minimizing damage to the flexible display, the large radius of curvature of the folding portion also causes significant color deviation around the folding portion of the display.

Figure 1:
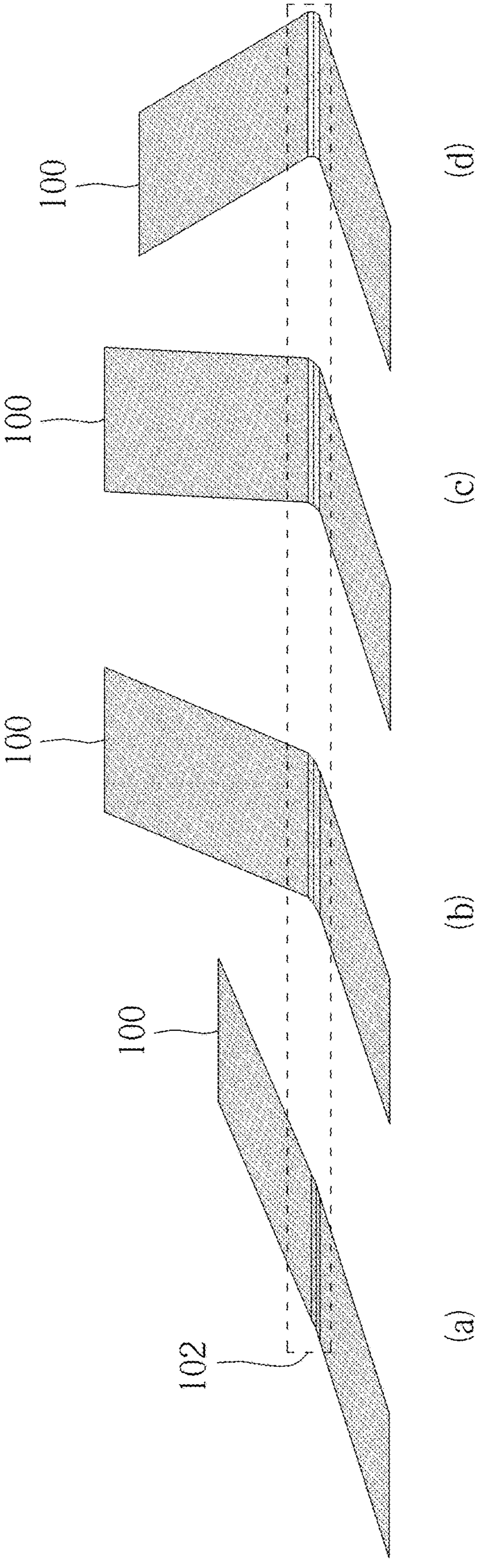
FIG. 1 is a schematic diagram of color deviation caused by different folding angles of a flexible display.
Figure 2:
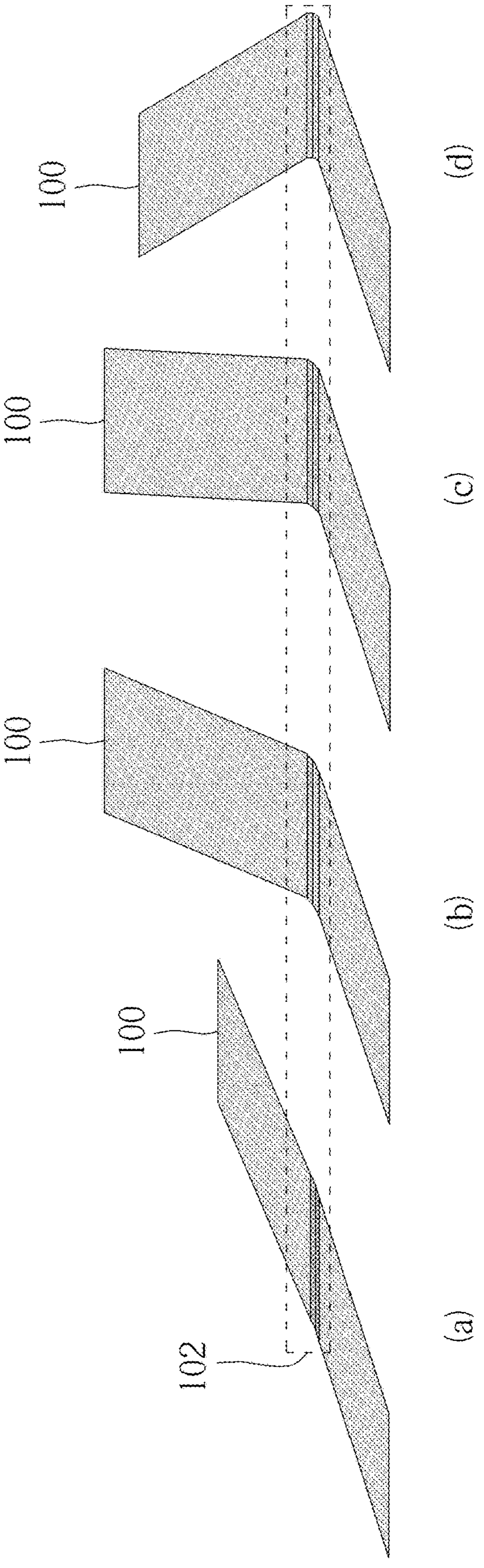
FIG. 2 is a schematic diagram of color deviation compensation for a flexible display with a fixed value.

Please refer to FIG. 1, which is a schematic diagram of the color deviation caused by different folding angles of a flexible display 100. The flexible display 100 may be used in an electronic device such as a foldable phone where the display panel needs to be bent repeatedly, and is not limited thereto. As shown in FIG. 1, a folding portion 102 of the flexible display 100 produces different degrees of color deviation as the angle changes, which affects the user's visual experience. In order to avoid affecting the display effect of the flexible display 100, a possible technique is to use a fixed value to compensate for the color deviation in the area around the folding portion 102 where the color deviation may occur. However, as the folding angle increases, the degree of color deviation caused by the bending of the flexible display 100 varies. As shown in FIG. 1, cases (a) to (d) illustrate four different folding angles of the folding portion 102 of the flexible display 100, and as the folding angle increases, the degree of color deviation produced around the folding portion 102 varies. In this situation, when a fixed value is used to compensate for the area with color deviation, the effect of color deviation compensation is not as expected (e, g., overcompensation or undercompensation) at some folding angles. Please refer to FIG. 2, which is a schematic diagram of color deviation compensation for the flexible display 100 with a fixed value. Cases (a) to (d) in FIG. 2 illustrate the results of color deviation compensation for the flexible display 100 at four different folding angles of the folding portion 102 in FIG. 1 according to the fixed value. As shown in FIG. 2, when the folding angle in case (d) is used as the target angle for performing the color deviation compensation, there is no color distortion in the folding portion 102 of the flexible display 100 after performing the color deviation compensation in case (d); however, in case (a), which has a large difference in the folding angle from that in case (d), there is overcompensation in the folding portion 102 after performing the color deviation compensation. In this situation, the existing technology is not able to satisfy the application requirements of flexible displays at various folding angles at the same time, and is not able to dynamically improve the color deviation problem according to the different folding angles.

Therefore, the embodiment of the present invention obtains an instantaneous folding angle when the folding angle of the flexible display 100 is changed, and performs color deviation compensation for the area with color deviation in the folding portion 102 of the flexible display 100, so as to improve the deficiencies of the prior arts.

Figure 3A:
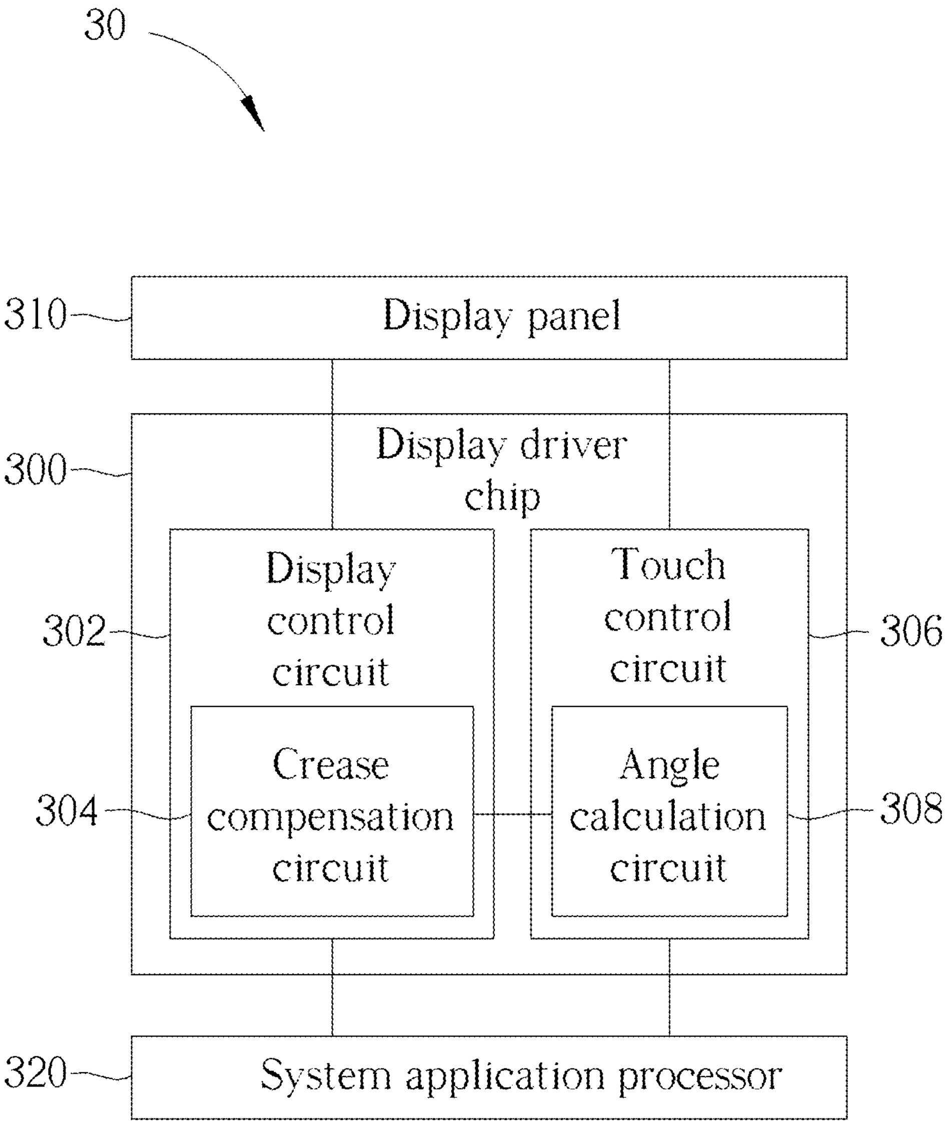
FIG. 3A and FIG. 3B are schematic diagrams of the architecture of a flexible display according to an embodiment of the present invention.

Please refer to FIG. 3A, which is a schematic diagram of the architecture of a flexible display 30 according to an embodiment of the present invention. The flexible display 30 comprises a display driver chip 300, a display panel 310, and a system application processor 320. The display driver chip 300 may be a touch and display driver integration (TDDI) chip comprising touch functionalities, and is coupled to the display panel 310 and the system application processor 320. The display driver chip 300 comprises a display control circuit 302, a crease compensation circuit 304, a touch control circuit 306, and an angle calculation circuit 308. The display control circuit 302 is coupled to the display panel 310, and comprises, but is not limited to, sub-circuits such as timing controllers, source drivers, and gate drivers (not illustrated in FIG. 3A). The display control circuit 302 is used to provide a drive signal containing a pixel value to the display panel 310. The crease compensation circuit 304 is coupled to the display control circuit 302 for performing the color deviation compensation method of the embodiment of the present invention to perform color deviation compensation for the pixels. The touch control circuit 306 is coupled to a touch sensing layer of the display panel 310, and comprises, but is not limited to, driving circuits and sensing circuits for realizing touch control functionality (not illustrated in FIG. 3A). The angle calculation circuit 308 is coupled to the touch control circuit 306 and the crease compensation circuit 304. The angle calculation circuit 308 is used for estimating the folding angle based on capacitance values or capacitance changes on both sides of the folding portion in the touch sensor layer of the display panel 310, and providing the estimated folding angle to the crease compensation circuit 304. Accordingly, the crease compensation circuit 304 is able to perform color deviation compensation for the pixels based on the folding angle estimated by the angle calculation circuit 308. In this embodiment, in addition to integrating the touch and display functions, the display driver chip 300 is capable of directly obtaining the folding angle through the touch detection function and directly compensating for the color deviation of the image, reducing the complexity of the product design.

Figure 3B:
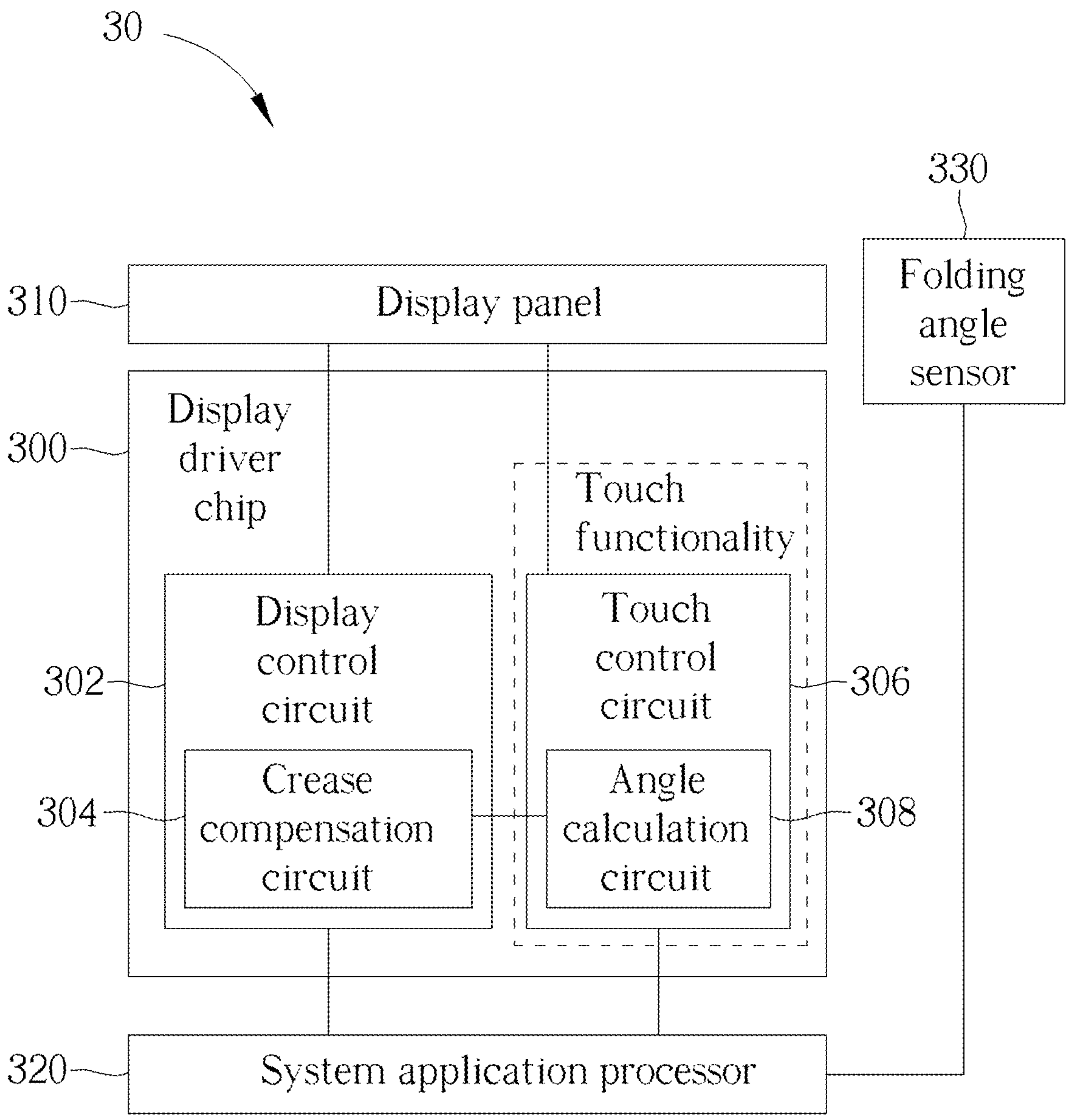

Please refer to FIG. 3B, which is a schematic diagram of another architecture of the flexible display 30 according to an embodiment of the present invention. In this embodiment, the flexible display 30 further comprises a folding angle sensor 330 coupled to the system application processor 320 for detecting the folding angle through a hinge mechanism of the folding portion of the flexible display 30. The system application processor 320 detects the folding angle through the folding angle sensor 330 and provides the folding angle to the crease compensation circuit 304. In this embodiment, the display driver chip 300 may be a TDDI chip with the touch functionality (the touch control circuit 306 and an angle calculation circuit 308) or a display driver chip without the touch functionality. When the display driver chip 300 is the TDDI chip with the touch functionality, the crease compensation circuit 304 may obtain the folding angle estimated by the angle calculation circuit 308 through the angle calculation circuit 308 or the folding angle detected by the folding angle sensor 330 through the system application processor 320. When the display driver chip 300 is the display driver chip without the touch functionality, the crease compensation circuit 304 obtains the folding angle detected by the folding angle sensor 330 through the system application processor 320. Accordingly, the crease compensation circuit 304 is able to perform color deviation compensation for pixels based on the folding angle estimated by the angle calculation circuit 308 or the folding angle detected by the folding angle sensor 330.

Figure 4:
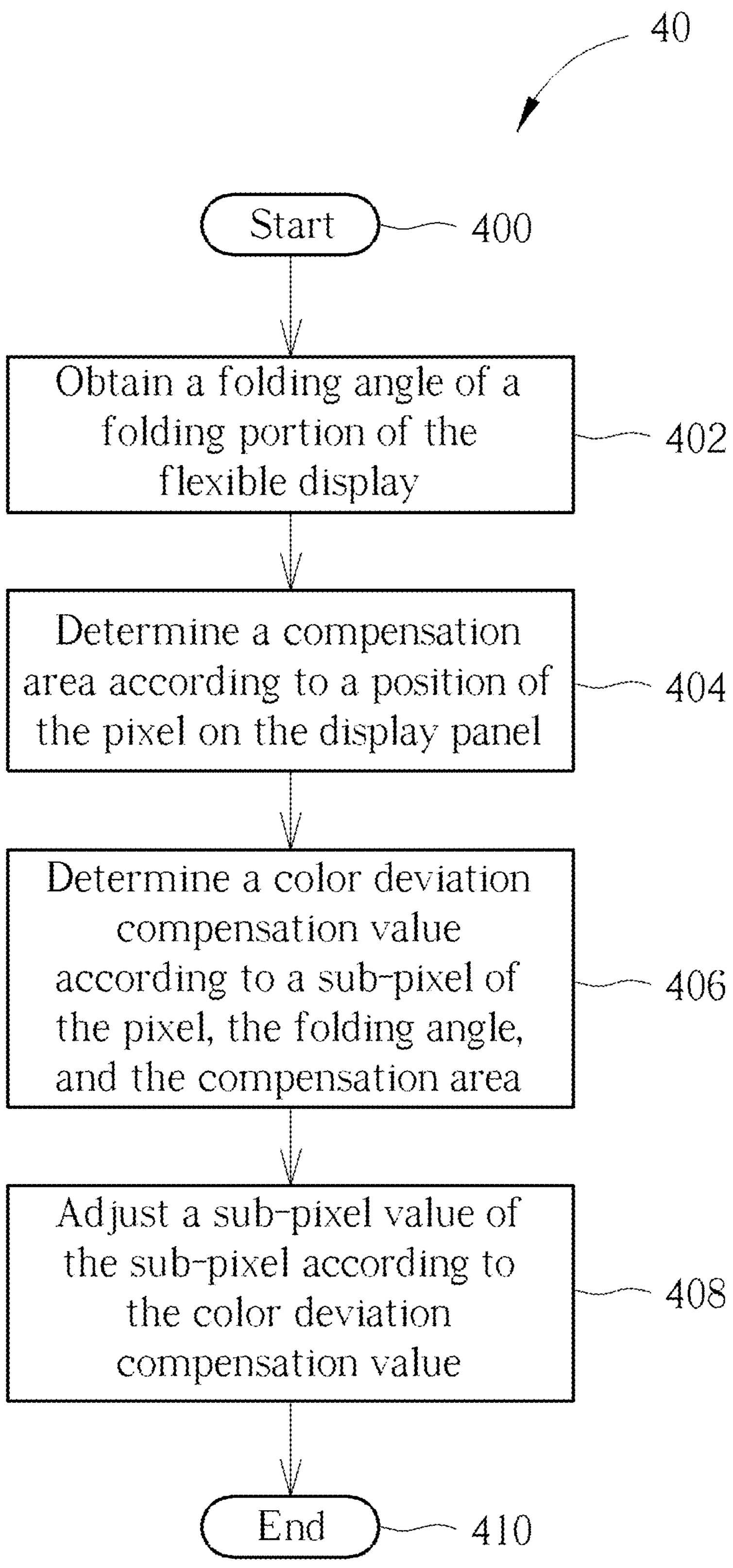
FIG. 4 is a schematic diagram of a flowchart for a color deviation compensation process according to an embodiment of the present invention.

The color deviation compensation method of the embodiment of the present invention may be summarized into a color deviation compensation process 40, which is performed by the crease compensation circuit 304 when the folding angle of the folding portion is changed, so as to compensate for color deviation to each pixel in the area with color deviation around the folding portion. Specifically, the crease compensation circuit 304 needs to obtain the folding angle of the folding portion and determines a color deviation compensation value for each sub-pixel of the pixel based on the obtained folding angle. The sub-pixels include red, green, and blue sub-pixels, and the crease compensation circuit 304 adjusts a sub-pixel value according to the color deviation compensation values of the red, green, and blue sub-pixels respectively. Please refer to FIG. 4, the color deviation compensation process 40 comprises the following steps:

Step 400: Start.

Step 402: The crease compensation circuit 304 obtains a folding angle of a folding portion of the flexible display 30.

Step 404: The crease compensation circuit 304 determines a compensation area according to a position of the pixel on the display panel.

Step 406: The crease compensation circuit 304 determines a color deviation compensation value according to a sub-pixel of the pixel, the folding angle, and the compensation area.

Step 408: The crease compensation circuit 304 adjust a sub-pixel value of the sub-pixel according to the color deviation compensation value.

Step 410: End.

According to the color deviation compensation process 40, the crease compensation circuit 304 firstly obtains the folding angle of the folding portion of the flexible display 30 (Step 402), and then determines the color deviation compensation value for a sub-pixel of the pixel based on the folding angle (Step 404 and Step 406). Finally, the crease compensation circuit 304 adjusts a sub-pixel value of the sub-pixel based on the color deviation compensation value (Step 408). Accordingly, the crease compensation circuit 304 is able to adjust the display image of the flexible display 30 in time when the folding angle of the folding portion changes, improving the color deviation problem.

In detail, in Step 402, the crease compensation circuit 304 firstly needs to obtain the folding angle of the folding portion when the folding angle changes. Please continue to refer to FIG. 3A and FIG. 3B. In the embodiment of FIG. 3A, the flexible display 30 does not comprise the folding angle sensor 330, and the display driver chip 300 is a TDDI chip. In this situation, the crease compensation circuit 304 needs to obtain the folding angle of the folding portion through the angle calculation circuit 308, that is, the crease compensation circuit 304 obtains the folding angle through the touch control circuit 306. In the embodiment of FIG. 3B, the flexible display 30 comprises the folding angle sensor 330, and the system application processor 320 detects the folding angle through the folding angle sensor 330 and then provides the folding angle to the crease compensation circuit 304. When the display driver chip 300 comprises the touch control functionality, the crease compensation circuit 304 obtains the folding angle through the touch control circuit 306 or obtains the folding angle detected by the folding angle sensor 330 through the system application processor 320. When the display driver chip 300 does not comprise the touch control functionality, the crease compensation circuit 304 needs to obtain the folding angle detected by the folding angle sensor 330 through the system application processor 320.

Figure 5:
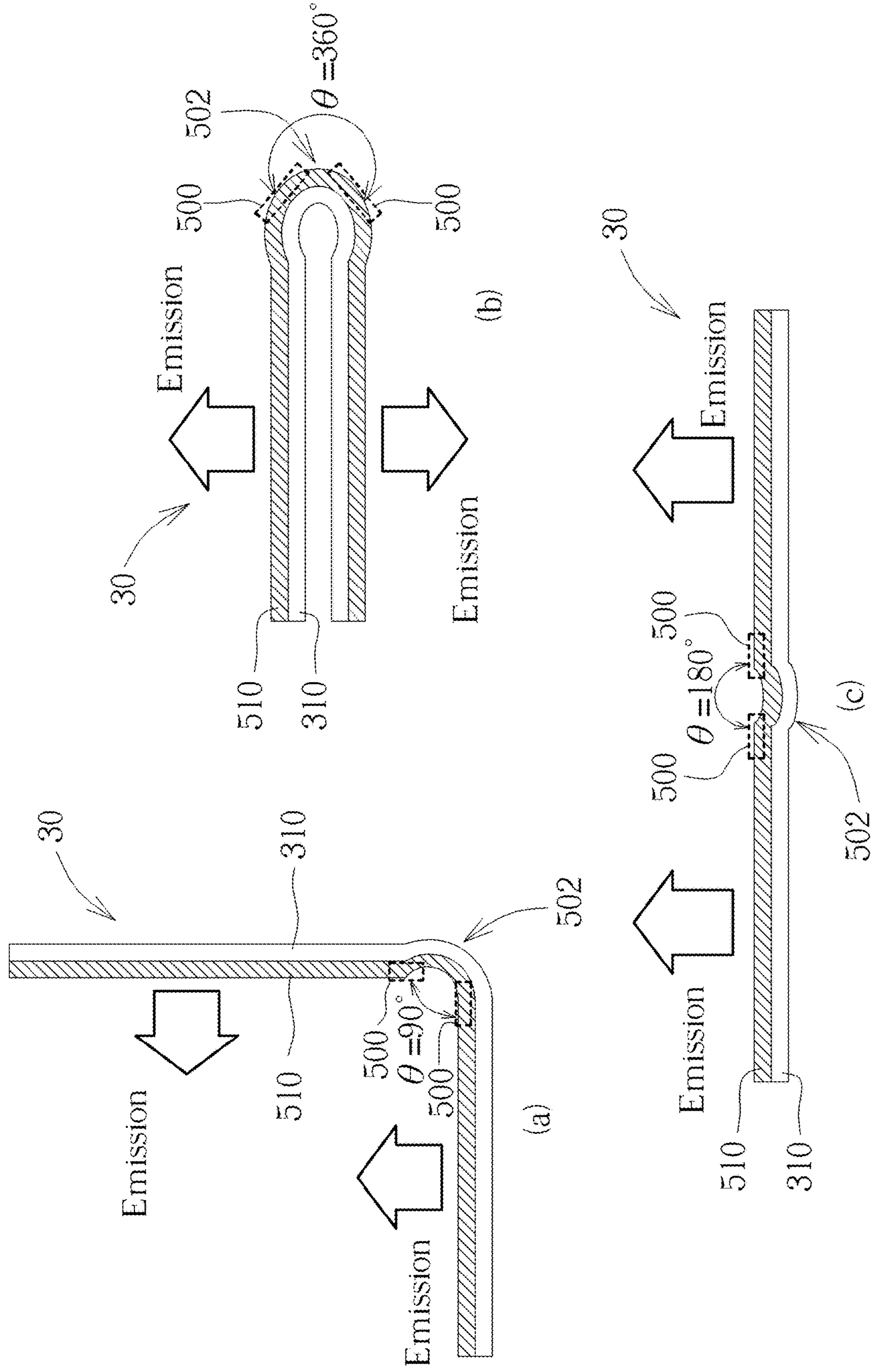
FIG. 5 is a schematic diagram of estimating a folding angle through an angle calculation circuit according to an embodiment of the present invention.

Specifically, please refer to FIG. 5, which is a schematic diagram of estimating a folding angle through the angle calculation circuit 308 according to an embodiment of the present invention. FIG. 5 illustrates the flexible display 30 of FIG. 3A and FIG. 3B, which comprises a display panel 310 and a touch sensing layer 510. In this embodiment, the angle calculation circuit 308 estimates a folding angle θ of a folding portion 502 based on the sensing values of touch sensors 500 on both sides of the folding portion 502 on the touch sensing layer 510. As the folding angle of the folding portion 502 changes, the touch sensors 500 may be squeezed or distanced, resulting in a change in the measured capacitance of the touch sensors 500. Accordingly, the angle calculation circuit 308 estimates the folding angle of the folding portion 502 based on the change in the capacitance value of the touch sensors 500. This embodiment is applicable to various folding angles of the flexible display 30, such as inward folding, outward folding, and unfolding states as shown in cases (a), (b), and (c) in FIG. 5, and is not limited thereto.

Accordingly, in Step 402, the crease compensation circuit 304 obtains the instantaneous folding angle directly through the angle calculation circuit 308 or through the system application processor 320 to obtain the folding angle detected by the folding angle sensor 330.

According to the Color Deviation Compensation Process 40, in Step 404, the crease compensation circuit 304 determines a compensation area where the pixel is located based on the position of the pixel on the display panel. The color deviation caused by bending is transitional and gradual. In general, the color deviation is severer near the folding portion and slighter farther away from the folding portion. Conventional techniques for compensating for color deviation based on a fixed position and a fixed value result in color discontinuity in the image. Therefore, the color deviation compensation method of the embodiment further comprises dividing the area adjacent to the folding portion with color deviation into a plurality of compensation areas, that the color deviation compensation may achieve the effect of smooth gradual transition, improving the display quality of the flexible display.

Figure 6:
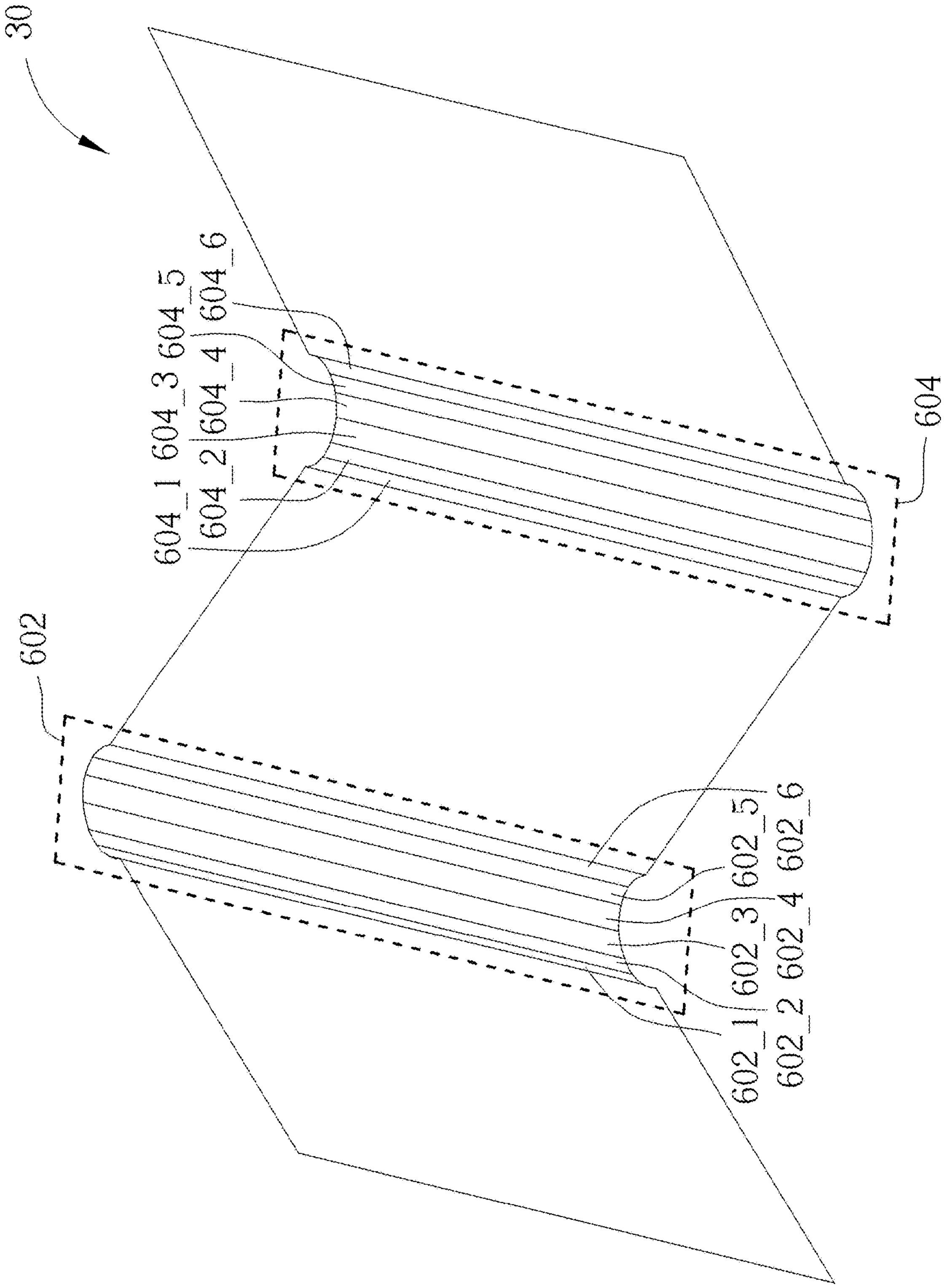
FIG. 6 is a schematic diagram of division of the area with color deviation according to an embodiment of the present invention.

Please refer to FIG. 6, which is a schematic diagram of the division of the area with color deviation according to an embodiment of the present invention. As shown in FIG. 6, the flexible display 30 comprises two folding portions 602 and 604, where the display area adjacent to the folding portion 602 is divided into six compensation areas 602_1 to 602_6, and the display area adjacent to the folding portion 604 is divided into six compensation areas 604_1 to 604_6. Accordingly, the embodiment of the present invention is able to optimize the color deviation compensation according to different folding angles and different compensation areas. It should be noted, the flexible display 30 of FIG. 6 is illustrated to have two folding portions, and the two folding portions are divided into six compensation zones separately, but is not limited thereto. Those skilled in the arts may design a different number and size of compensation areas for each folding portion according to the actual requirements to achieve a better color deviation compensation effect.

In Step 406, the crease compensation circuit 304 determines a color deviation compensation value for the pixel based on each sub-pixel, the folding angle obtained in Step 402, and the compensation area determined in Step 404. First, the crease compensation circuit 304 determines a first lookup table and a second lookup table based on the sub-pixels, the folding angle and the compensation area.

Figure 7:
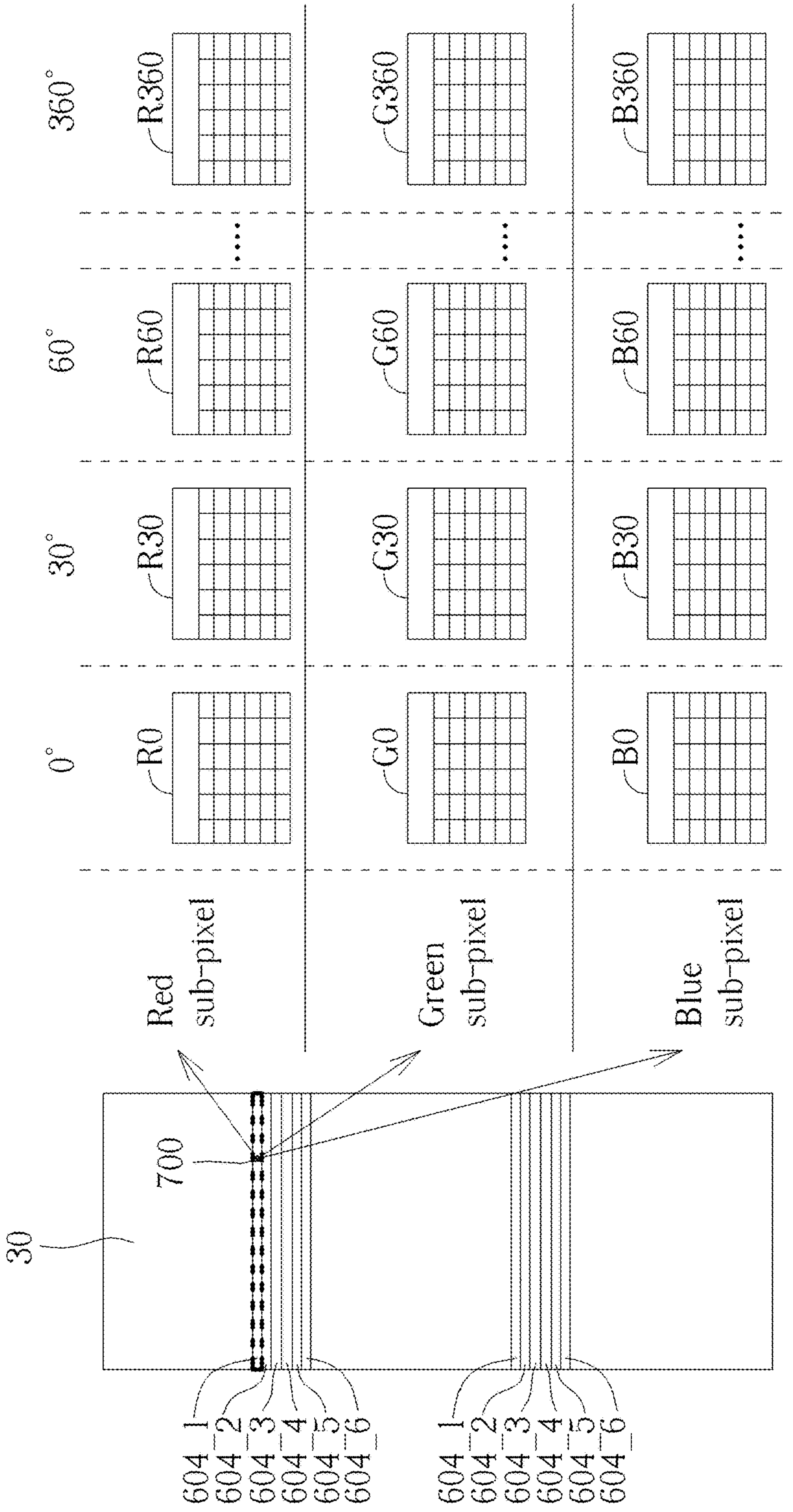
FIG. 7 is a schematic diagram of selecting a lookup table for color deviation compensation based on a sub-pixel, a folding angle, and a compensation area according to an embodiment of the present invention.

In detail, Please refer to FIG. 7, which is a schematic diagram of selecting a lookup table for color deviation compensation based on a sub-pixel, a folding angle, and a compensation area according to an embodiment of the present invention. FIG. 7 illustrates the two folding portions 602 and 604 of the flexible display 30 in FIG. 6 and the compensation areas 602_1 to 602_6 and 604_1 to 604_6 thereof. Each compensation area is set up with different lookup tables for color deviation compensation based on the red, green, and blue sub-pixels and the folding angles (FIG. 7 illustrates only a part of the lookup tables for the compensation area 602_1). As shown in FIG. 7, the crease compensation circuit 304 is set up with lookup tables R0, R30, R60, R360 for the red sub-pixels, G0, G30, G60, . . . , G360 for the green sub-pixels, and B0, B30, B60, . . . , B360 for the blue sub-pixels, which correspond to folding angles of 0, 30, . . . , 360 degrees respectively in a unit of 30 degrees. The crease compensation circuit 304 needs to determine a first lookup table and a second lookup table that are closest to the folding angle based on the red, green, and blue sub-pixel of the pixel, respectively. Specifically, the first lookup table corresponds to the angle that is closest to and smaller than or equal to the folding angle, and the second lookup table corresponds to the angle that is closest to and larger than or equal to the folding angle. Taking a pixel 700 in FIG. 7 as an example, and assuming that the pixel 700 is located in the folding portion 602 of the flexible display 30 and produces color deviation. The crease compensation circuit 304 obtains the folding angle of the folding portion 602 as 50 degrees according to Step 402, and determines that the pixel 700 is located in the compensation area 602_1 according to Step 404. Next, the crease compensation circuit 304 determines for the red sub-pixel of the pixel 700 that the first lookup table is the lookup table R30 for a 30-degree angle and the second lookup table is the lookup table R60 for a 60-degree angle. Similarly, the crease compensation circuit 304 determines for the green sub-pixel of pixel 700 that the first lookup table is the lookup table G30 for a 30-degree angle and the second lookup table is the lookup table G60 for a 60-degree angle; and determines for the blue sub-pixel of pixel 700 that the first lookup table is a lookup table B30 for a 30-degree angle and the second lookup table to be B 60 for a 60 degree angle.

Next, in Step 406, the crease compensation circuit 304 needs to obtain a first compensation value and a second compensation value from the first lookup table and the second lookup table respectively based on the sub-pixel value of the pixel and a display brightness value of the flexible displays 30. Specifically, the crease compensation circuit 304 needs to look up a plurality of corresponding compensation values that are close to the sub-pixel value and the display brightness value in the first lookup table and the second lookup table respectively, and calculate the first compensation value and the second compensation value through interpolation.

Figure 8:
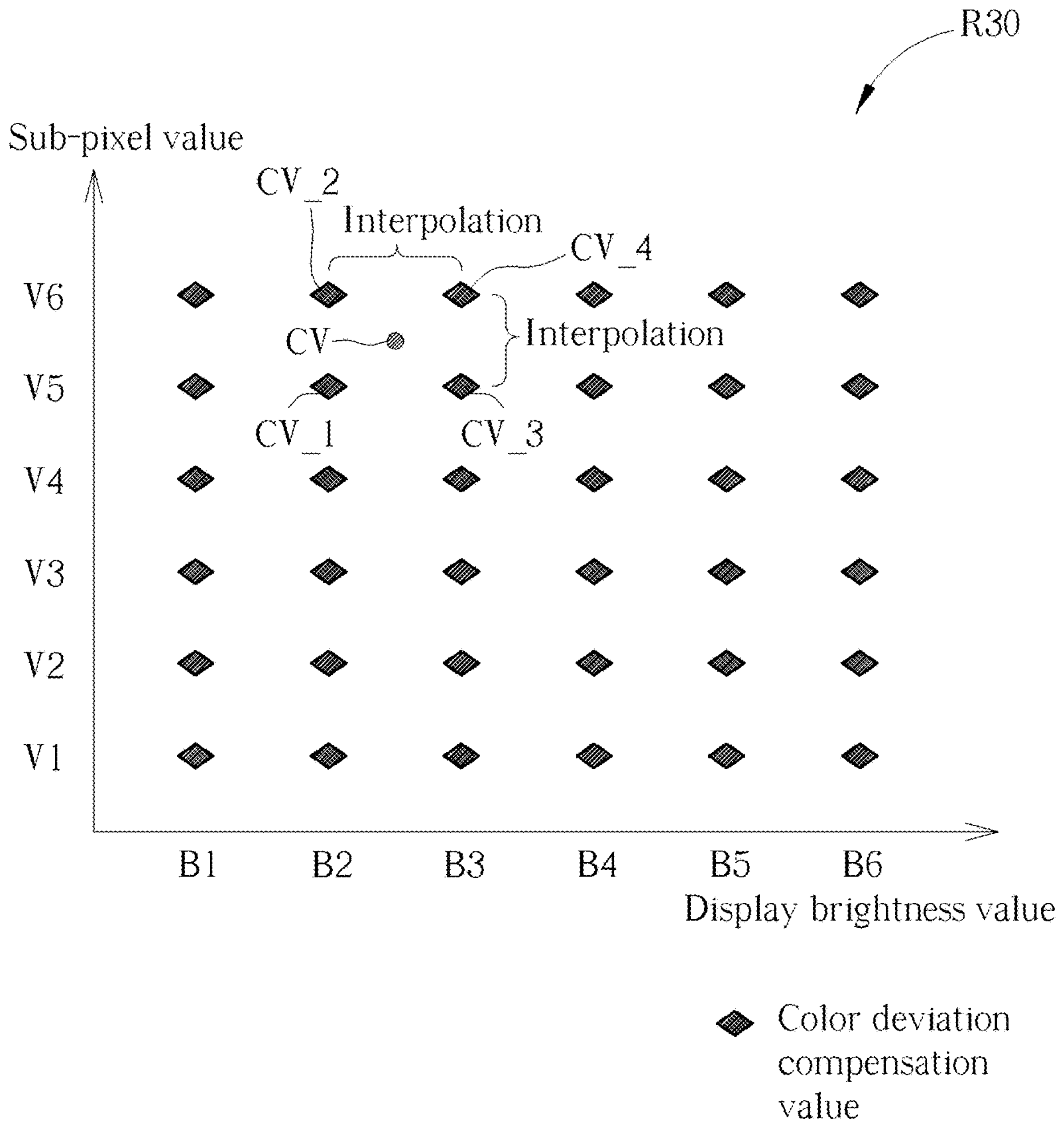
FIG. 8 is a schematic diagram of a lookup table for color deviation compensation according to an embodiment of the present invention.

Please refer to FIG. 8, which is a schematic diagram of the lookup table R30 for color deviation compensation according to an embodiment of the present invention. As shown in FIG. 8, the lookup table R30 is used to look up a color deviation compensation value based on a sub-pixel value and a display brightness value. In this embodiment, the display brightness value is categorized into 6 levels B1 to B6, and the sub-pixel values are also categorized into 6 levels V1 to V6, but are not limited thereto, those skilled in the art need to make adjustments and modifications according to the performance and the actual requirements. Taking the aforementioned pixel 700 as an example, the lookup table R30 is the first lookup table for determining the first compensation value of the red sub-pixel of the pixel 700. Assuming that the red sub-pixel value of the pixel 700 is between sub-pixel values V5 and V6, and the display brightness value of flexible display 30 is between display brightness levels B2 and B3, the crease compensation circuit 304 obtains the first compensation value CV of the red sub-pixel value of the pixel 700 by calculating through interpolation of color deviation compensation values CV_1, CV_2, CV_3, and CV_4 corresponding to (B2, V5), (B2, V6), (B3, V5), and (B3, V6) respectively. Similarly, based on the lookup table R60, the crease compensation circuit 304 obtains the second compensation value of the red sub-pixel value of the pixel 700 by calculating through interpolation according to the red sub-pixel of the pixel 700 and the display brightness value of the flexible display 30. Accordingly, the crease compensation circuit 304 is able to obtain the color deviation compensation values for the red, green, and blue sub-pixels of the pixel 700 respectively.

Next, in Step 406, the crease compensation circuit 304 calculates the color deviation compensation value of the sub-pixel through interpolation between the first compensation value and the second compensation value according to the folding angle. Taking the aforementioned pixel 700 as an example, where the first lookup table R30 corresponds to an angle of 30 degrees, and the second lookup table R60 corresponds to an angle of 60 degrees. The crease compensation circuit 304 calculates a color deviation compensation value applicable to a folding angle of 50 degrees based on the first compensation value and the second compensation value that corresponds to an angle of 30 degrees and an angle of 60 degrees respectively.

Finally, in Step 408, the Crease Compensation Circuit 304 adjusts the values of the red, green, and blue sub-pixels according to the color deviation compensation values of the red, green, and blue sub-pixels calculated in Step 406 respectively. The display driver chip 300 outputs driving signals to the display panel 310 based on the pixels compensated for the color deviation by the crease compensation circuit 304.

Accordingly, the Crease Compensation Circuit 304 is Capable of adjusting the display image adjacent to the folding portion according to changes in the folding angle at any time to optimize the display effect of the flexible display.

Figure 9:
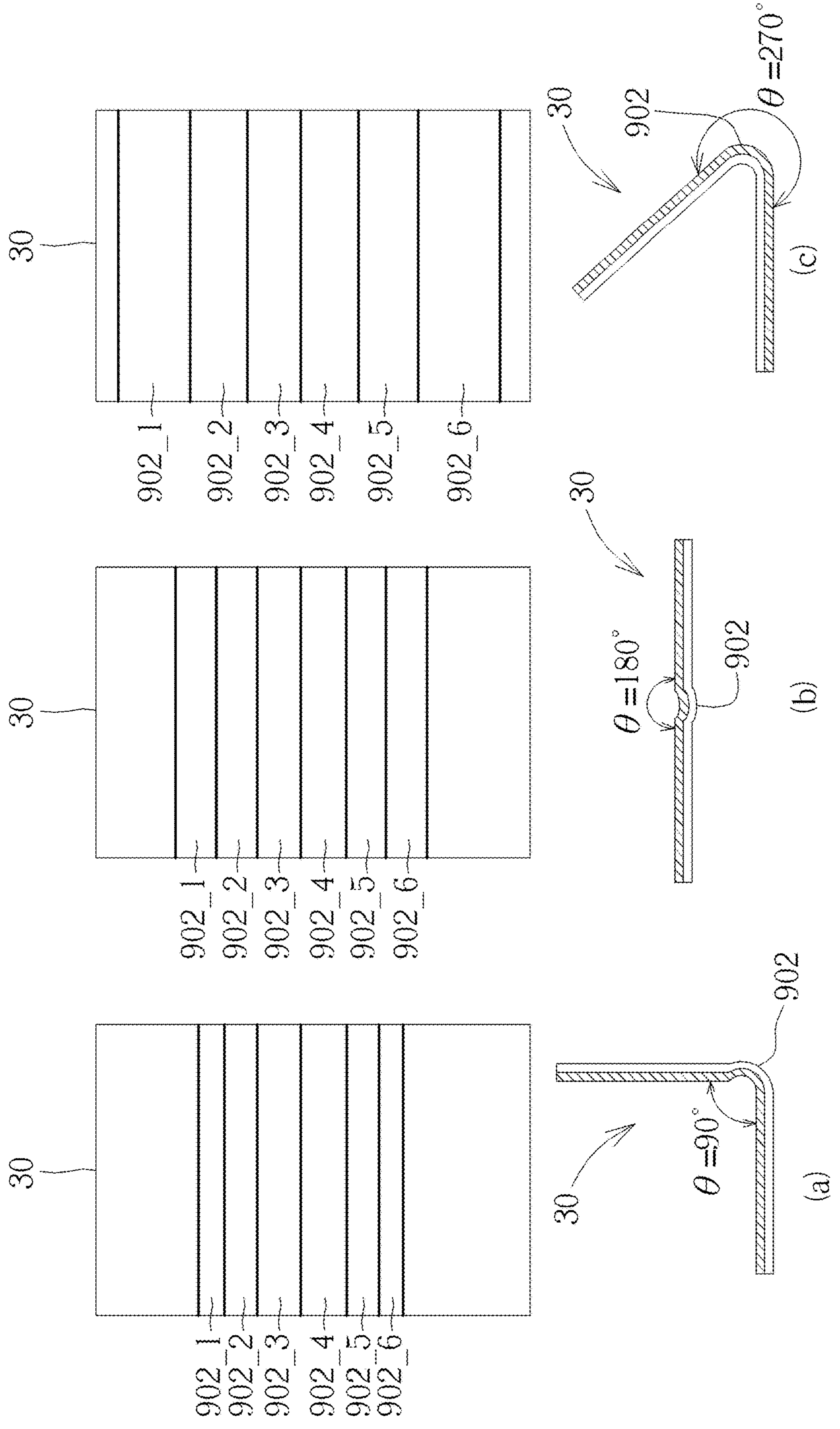
FIG. 9 is a schematic diagram of adjusting ranges and sizes of the compensation areas based on different folding angles according to an embodiment of the present invention.

Different folding angles of a flexible display may affect not only the degree of color deviation, but also the range with color deviation. However, based on the design of the hinge mechanism, the bending pattern of the panel of the flexible display is expected at different folding angles. Therefore, in an embodiment, the color deviation compensation method of the present invention may further comprise adjusting the ranges and sizes of the compensation areas according to different folding angles. Please refer to FIG. 9, which is a schematic diagram of adjusting the ranges and sizes of the compensation areas based on the different folding angles according to an embodiment of the present invention. In FIG. 9, the flexible display 30 comprises a folding portion 902, and the crease compensation circuit 304 divides the area adjacent to the folding portion 902 into six compensation areas 902_1 to 902_6. Cases (a), (b), and (c) in FIG. 9 illustrating the compensation areas 902_1 to 902_6 for folding angles of 90 degrees, 180 degrees, and 270 degrees, respectively. As shown in FIG. 9, the crease compensation circuit 304 adjusts the range and size of the compensation areas 902_1 to 902_6 according to the different folding angles. In addition, the overall range of the compensation areas for color deviation compensation is also adjusted according to the different folding angles. For example, the overall range of compensation areas 902_1 to 902_6 in case (c) with a larger folding angle is larger than in case (a) with a smaller folding angle.

Figure 10:
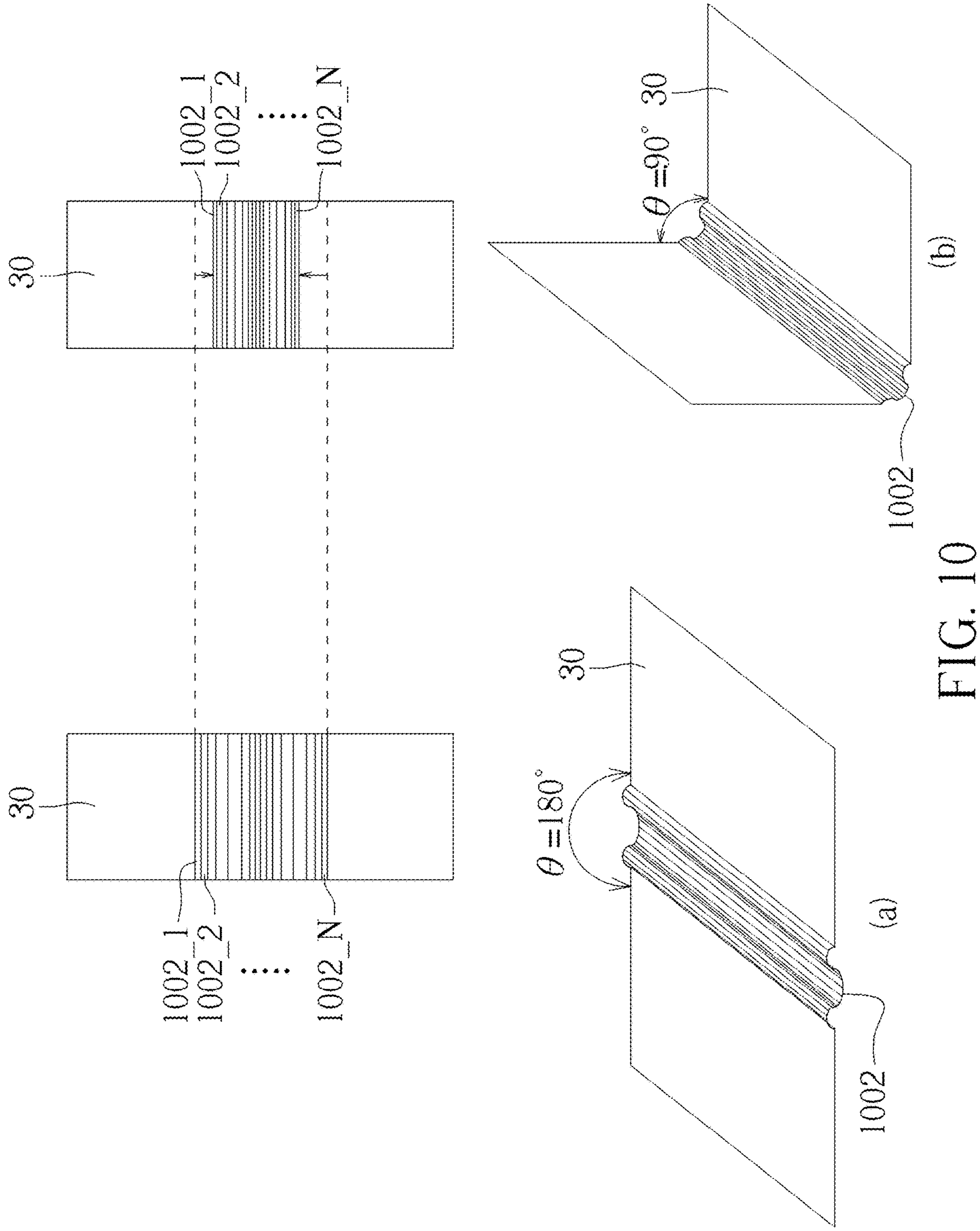
FIG. 10 is a schematic diagram of an irregular crease pattern according to an embodiment of the present invention.

Moreover, depending on the hinge mechanism used in the flexible display, the creases of the folding portion may have different patterns. Therefore, in an embodiment, the color deviation compensation method further comprises adjusting the number of the compensation areas according to the crease pattern of the folding portion. Please refer to FIG. 10, which is a schematic diagram of an irregular crease pattern according to an embodiment of the present invention. As shown in FIG. 10, the flexible display 30 comprises a folding portion 1002, and the folding portion 1002 has a wave-like crease pattern. In this case, the degrees of color deviation produced by individual parts of the crease varies greatly, therefore, the crease compensation circuit 304 subdivides area adjacent to the folding portion 1002 into more compensation areas 1002_1 to 1002_N to achieve better zonal compensation effect. In addition, as the folding angle changes, the crease compensation circuit 304 further adjusts the ranges and sizes of the compensation areas 1002_1 to 1002_N. As shown in case (b) of FIG. 10, when the crease is squeezed, the crease compensation circuit 304 reduces the overall range of the compensation areas 1002_1 to 1002_N to adapt to the effect of color deviation at various angles.

In summary, the present invention provides a display driver chip and color deviation compensation method thereof for compensating for color deviation in different areas according to different folding angles when the folding angle of a flexible display changes, improving the image quality of the flexible display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display driver chip for a flexible display, comprising:
- a display control circuit, coupled to a display panel of the flexible display, configured to provide a driving signal to a corresponding pixel of the display panel; and
- a crease compensation circuit, coupled to the display control circuit, configured to execute a color deviation compensation method, wherein the color deviation compensation method comprises the following instructions:
  - obtaining a folding angle of a folding portion of the flexible display;
  - determining a color deviation compensation value for a sub-pixel of the pixel according to the folding angle; and
  - adjusting a sub-pixel value of the sub-pixel according to the color deviation compensation value;
  - wherein the instruction for determining the color deviation compensation value for the sub-pixel of the pixel according to the folding angle comprises:
    - determining a first lookup table and a second lookup table according to the sub-pixel, the folding angle and a compensation area;
    - obtaining a first compensation value and a second compensation value in the first lookup table and the second lookup table respectively according to the sub-pixel value and a display brightness value (DBV) of the flexible display; and
    - calculating the color deviation compensation value through interpolation between the first compensation value and the second compensation value based on the folding angle.

2. The display driver chip of claim 1, wherein the crease compensation circuit executes the color deviation compensation method when the folding angle is changed.

3. The display driver chip of claim 1, wherein the crease compensation circuit is coupled to a system application processor, and the system application processor detects the folding angle through a folding angle sensor so as to obtain the folding angle.

4. The display driver chip of claim 1, further comprising a touch control circuit coupled to the crease compensation circuit and a touch sensing layer of the flexible display.

5. The display driver chip of claim 1, wherein the crease compensation circuit obtains the folding angle through a touch control circuit.

6. The display driver chip of claim 5, wherein the touch control circuit determines the folding angle based on capacitance changes on both sides of the folding portion in a touch sensing layer of the flexible display.

7. The display driver chip of claim 1, wherein the first lookup table corresponds to an angle closest to and less than or equal to the folding angle, and the second lookup table corresponds to an angle closest to and greater than or equal to the folding angle.

8. The display driver chip of claim 1, wherein the instruction for obtaining the first compensation value and the second compensation value in the first lookup table and the second lookup table respectively according to the sub-pixel value and the display brightness value of the flexible display is looking up a plurality of corresponding compensation values that are close to the sub-pixel value and the display brightness value in the first lookup table and the second lookup table respectively, and calculating the first compensation value and the second compensation value through interpolation.

9. The display driver chip of claim 1, wherein the instruction for determining the color deviation compensation value for the sub-pixel of the pixel according to the folding angle further comprises:
- determining the compensation area according to a position of the pixel on the display panel.

10. The display driver chip of claim 9, wherein the color deviation compensation method further comprises:
- dividing an area adjacent to the folding portion into a plurality of compensation areas; and
- adjusting ranges and sizes of the plurality of compensation areas according to different folding angles.

11. The display driver chip of claim 10, wherein the color deviation compensation method further comprises:
- adjusting a number of the plurality of compensation areas according to a crease pattern of the folding portion.

12. A color deviation compensation method, for a display driver chip of a flexible display, comprising:
- obtaining a folding angle of a folding portion of the flexible display;
- determining a color deviation compensation value for a sub-pixel of a pixel according to the folding angle; and
- adjusting a sub-pixel value of the sub-pixel according to the color deviation compensation value;
- wherein the step of determining the color deviation compensation value for the sub-pixel of the pixel according to the folding angle comprises:
  - determining a first lookup table and a second lookup table according to the sub-pixel, the folding angle and a compensation area;
  - obtaining a first compensation value and a second compensation value in the first lookup table and the second lookup table respectively according to the sub-pixel value and a display brightness value (DBV) of the flexible display; and
  - calculating the color deviation compensation value through interpolation between the first compensation value and the second compensation value based on the folding angle.

13. The color deviation compensation method of claim 12, being executed when the folding angle is changed.

14. The color deviation compensation method of claim 12, wherein the folding angle is detected by a folding angle sensor and obtained through a system application processor.

15. The color deviation compensation method of claim 12, wherein the display driver chip further comprises a touch control circuit, and the touch control circuit is coupled to a touch sensing layer of the flexible display.

16. The color deviation compensation method of claim 12, wherein the first lookup table corresponds to an angle closest to and less than or equal to the folding angle, and the second lookup table corresponds to an angle closest to and greater than or equal to the folding angle.

17. The color deviation compensation method of claim 12, wherein the step of obtaining the first compensation value and the second compensation value in the first lookup table and the second lookup table respectively according to the sub-pixel value and the display brightness value of the flexible display is looking up a plurality of corresponding compensation values that are close to the sub-pixel value and the display brightness value in the first lookup table and the second lookup table respectively, and calculating the first compensation value and the second compensation value by interpolation.

18. The color deviation compensation method of claim 12, further comprising:

obtaining, by a touch control circuit, the folding angle.

19. The color deviation compensation method of claim 18, wherein the touch control circuit determines the folding angle based on capacitance changes on both sides of the folding portion in a touch sensing layer of the flexible display.

20. The color deviation compensation method of claim 12, wherein the step of determining the color deviation compensation value for the sub-pixel of the pixel according to the folding angle further comprises:

determining the compensation area according to a position of the pixel on the display panel.

21. The color deviation compensation method of claim 20, further comprising:

dividing an area adjacent to the folding portion into a plurality of compensation areas; and adjusting ranges and sizes of the plurality of compensation areas according to different folding angles.

22. The color deviation compensation method of claim 21, further comprising:

adjusting a number of the plurality of compensation areas according to a crease pattern of the folding portion.

* * * * *